(12) United States Patent
Nakahata et al.

(10) Patent No.: US 8,384,324 B2
(45) Date of Patent: Feb. 26, 2013

(54) MOTOR DRIVE CIRCUIT

(75) Inventors: Masahiro Nakahata, Moriguchi (JP);
Toshiyuki Imai, Oizumi-machi (JP)

(73) Assignee: ON Semiconductor Trading, Ltd.,
Hamilton (BM)

( * ) Notice: Subject to any disclaimer, the term of this patent is extended or adjusted under 35 U.S.C. 154(b) by 218 days.

(21) Appl. No.: 13/010,506

(22) Filed: Jan. 20, 2011

(65) Prior Publication Data

US 2011/0181214 A1 Jul. 28, 2011

(30) Foreign Application Priority Data

Jan. 22, 2010 (JP) ................................. 2010-012427

(51) Int. Cl.
*H02P 6/16* (2006.01)
(52) U.S. Cl. ............... 318/400.04; 318/400.01; 318/700
(58) Field of Classification Search ............. 318/400.01, 318/400.04, 700
See application file for complete search history.

(56) References Cited

U.S. PATENT DOCUMENTS

| 8,030,864 B2* | 10/2011 | Imai et al. | 318/400.04 |
| 8,098,033 B2* | 1/2012 | Imai | 318/400.2 |
| 2010/0033118 A1* | 2/2010 | Imai et al. | 318/400.06 |
| 2011/0139412 A1* | 6/2011 | Mishima et al. | 165/121 |
| 2011/0260669 A1* | 10/2011 | Nakahata et al. | 318/503 |

FOREIGN PATENT DOCUMENTS

JP 2004153921 A 5/2004

* cited by examiner

*Primary Examiner* — Kawing Chan
(74) *Attorney, Agent, or Firm* — Osha Liang LLP

(57) ABSTRACT

A motor drive circuit is configured to drive a motor based on first and second position detection signals opposite in phase to each other, the signals having a frequency corresponding to a rotational speed of the motor and indicating a rotational position of the motor. The circuit includes a first level-shift circuit, a second level-shift circuit, a timing detecting circuit, and an output circuit. The first level-shift circuit is configured to shift a level of at least either one of the first and second position detection signals so that a first period, during which a first output signal corresponding to the first position detection signal is higher in level than a second output signal corresponding to the second position detection signal, becomes longer than a second period, during which the second output signal is higher in level than the first output signal.

6 Claims, 5 Drawing Sheets

US 8,384,324 B2

MOTOR DRIVE CIRCUIT

CROSS-REFERENCE TO RELATED APPLICATION

This application claims the benefit of priority to Japanese Patent Application No. 2010-012427, filed Jan. 22, 2010, of which full contents are incorporated herein by reference.

BACKGROUND OF THE INVENTION

1. Field of the Invention

The present invention relates to a motor drive circuit.

2. Description of the Related Art

Electronic devices such as a notebook personal computer employ a fan motor for cooling heat-generating components such as a processor. When driving the fan motor, a motor drive circuit configured to perform so-called soft-switching may be used which changes, in a gradual manner, a drive current of a motor coil to reduce the noise in the fan motor (see, e.g., Japanese Patent Laid-Open Publication No. 2004-153921).

For example, in the motor drive circuit of Japanese Patent Laid-Open Publication No. 2004-153921, a soft-switching period for changing the drive current of the motor coil in a gradual manner is constant. Therefore, for example, even when a rotational speed of the fan motor changes, the soft-switching period does not change. In such a motor drive circuit, for example, when the rotational speed of the fan motor is increased, the proportion of the soft-switching period in the period during which the fan motor is driven becomes large. Therefore, it occasionally becomes difficult to set the fan motor at a desired rotation. On the other hand, when the rotational speed of the fan motor is decreased, for example, the proportion of the soft-switching period in the period during which the fan motor is driven becomes small. Therefore, it occasionally becomes difficult to change the drive current in a gradual manner, resulting in increased noise of the fan motor.

SUMMARY OF THE INVENTION

A motor drive circuit according to an aspect of the present invention, which drives a motor based on first and second position detection signals opposite in phase to each other, the signals having a frequency corresponding to a rotational speed of the motor and indicating a rotational position of the motor, includes: a first level-shift circuit configured to shift a level of at least either one of the first and second position detection signals so that a period, during which a first output signal corresponding to the first position detection signal is higher in level than a second output signal corresponding to the second position detection signal, becomes longer than a period, during which the second output signal is higher in level than the first output signal; a second level-shift circuit configured to shift a level of at least either one of the first and second position detection signals so that a period, during which a third output signal corresponding to the first position detection signal is higher in level than a fourth output signal corresponding to the second position detection signal, becomes shorter than a period, during which the fourth output signal is higher in level than the third output signal; a timing detecting circuit configured to detect first timing at which the first and second output signals cross in level, and second timing at which the third and fourth output signals cross in level; and an output circuit configured to output, to a drive circuit configured to drive a coil of the motor, an instruction signal for changing a drive current of the coil in a gradual manner only during a period between the first timing and the second timing, the period including a third timing at which the first and second position detection signals cross in level.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
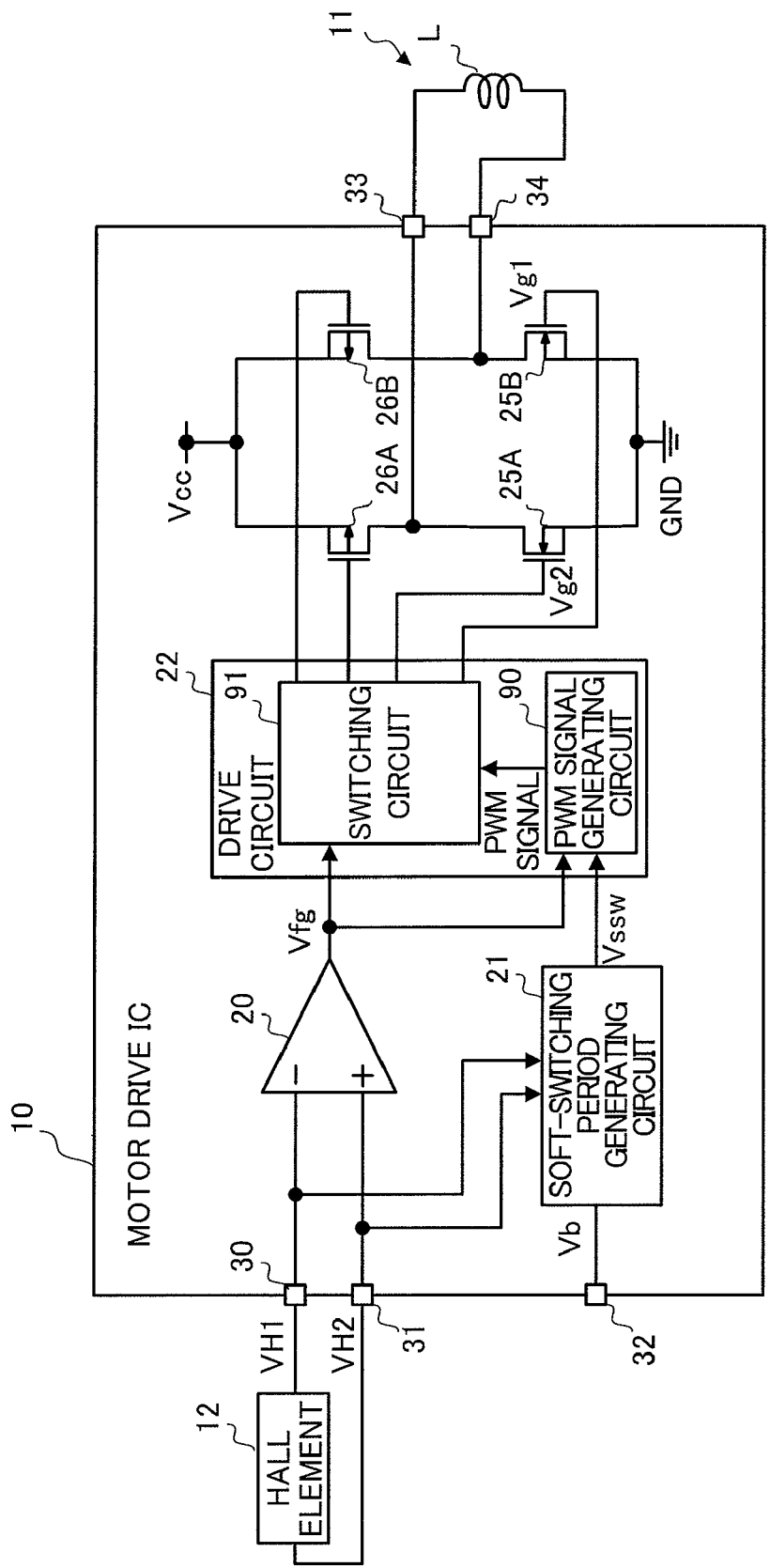
FIG. 1 is a diagram illustrating a configuration of a motor drive IC 10 according to an embodiment of the present invention.

FIG. 1 denotes a configuration of a motor drive IC 10 according to an embodiment of the present invention. The motor drive IC 10 is included in a fan motor for cooling heat-generating components, such as a processor, in electronic devices such as a notebook personal computer, for example.

The motor drive IC 10 is a circuit configured to drive a single-phase motor 11 to rotate a cooling fan, for example, and includes a comparator 20, a soft-switching period generating circuit 21, a drive circuit 22, NMOS transistors 25A and 25B, PMOS transistors 26A and 26B, and terminals 30 to 34.

A hall element 12 outputs hall signals VH1 (first position detection signal) and VH2 (second position detection signal) corresponding to a rotational position of a rotor (not shown) in the single-phase motor 11. The hall element 12 outputs the hall signals VH1 and VH2 which are opposite in phase to each other and have a frequency changing according to a rotational speed of the fan motor. The hall signals VH1 and VH2 according to an embodiment of the present invention are sinusoidal signals having an amplitude of a predetermined voltage level and are output to the terminals 30 and 31.

The comparator 20 compares levels of the hall signals VH1 and VH2 and generates a signal Vfg whose frequency changes according to the rotational speed of the single-phase motor 11. The signal Vfg is a so-called FG signal that goes to a low level (hereinafter, referred to as "L" level) when the level of the hall signal VH1 is higher than that of the hall signal VH2, and goes to a high level (hereinafter, referred to as "H" level) when the level of the hall signal VH1 is lower than that of the hall signal VH2.

The soft-switching period generating circuit 21 generates a signal Vssw for instructing the drive circuit 22 with respect to a period for soft-switching the single-phase motor 11, based on a voltage Vb generated in the soft-switching period generating circuit 21 and the hall signals VH1 and VH2 to be input thereto.

Figure 2:
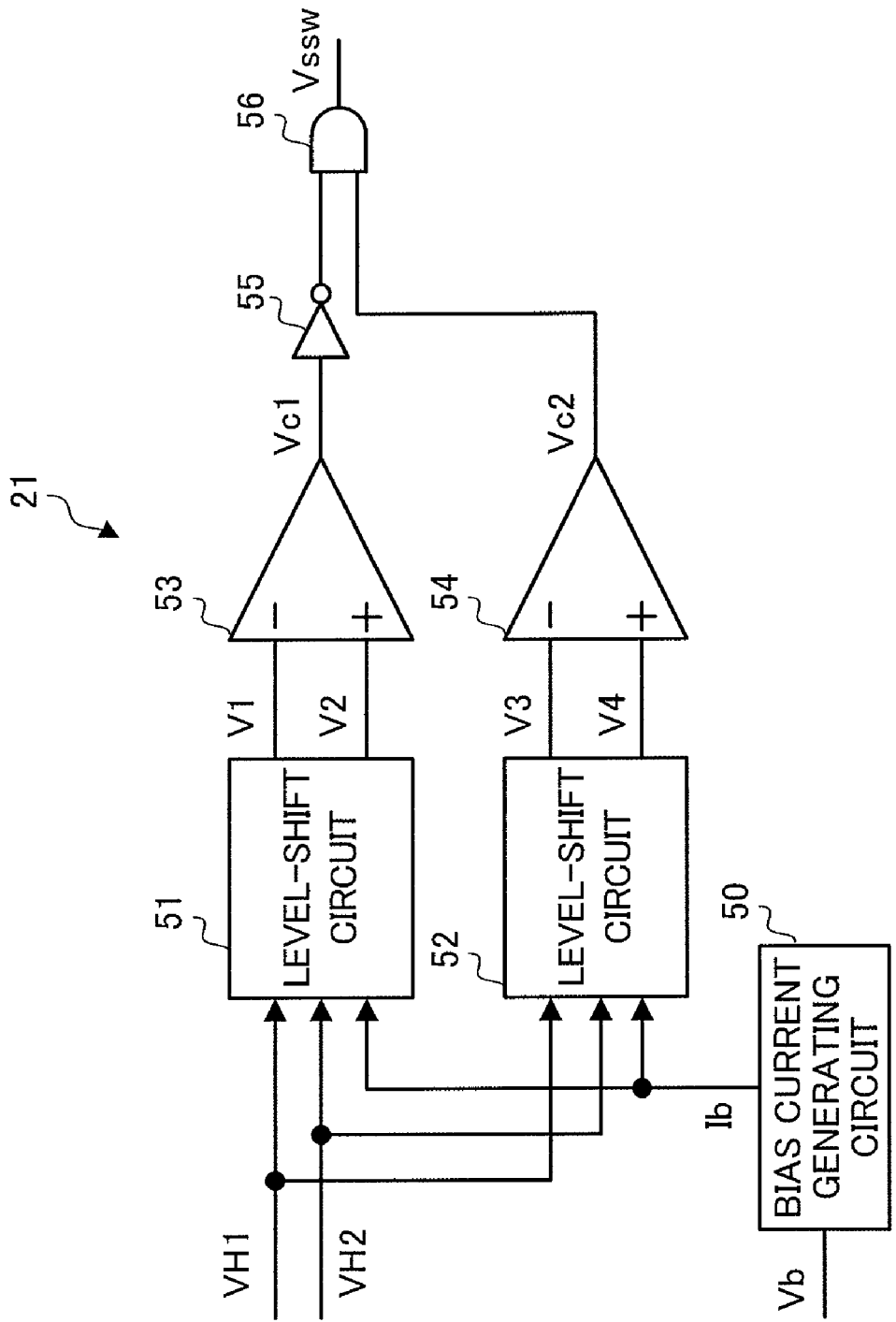
FIG. 2 is a diagram illustrating an embodiment of a soft-switching period generating circuit 21.

FIG. 2 depicts a configuration example of the soft-switching period generating circuit 21. The soft-switching period generating circuit 21 includes a bias current generating circuit 50, level-shift circuits 51 and 52, comparators 53 and 54, an inverter 55, and an AND circuit 56.

Figure 3:
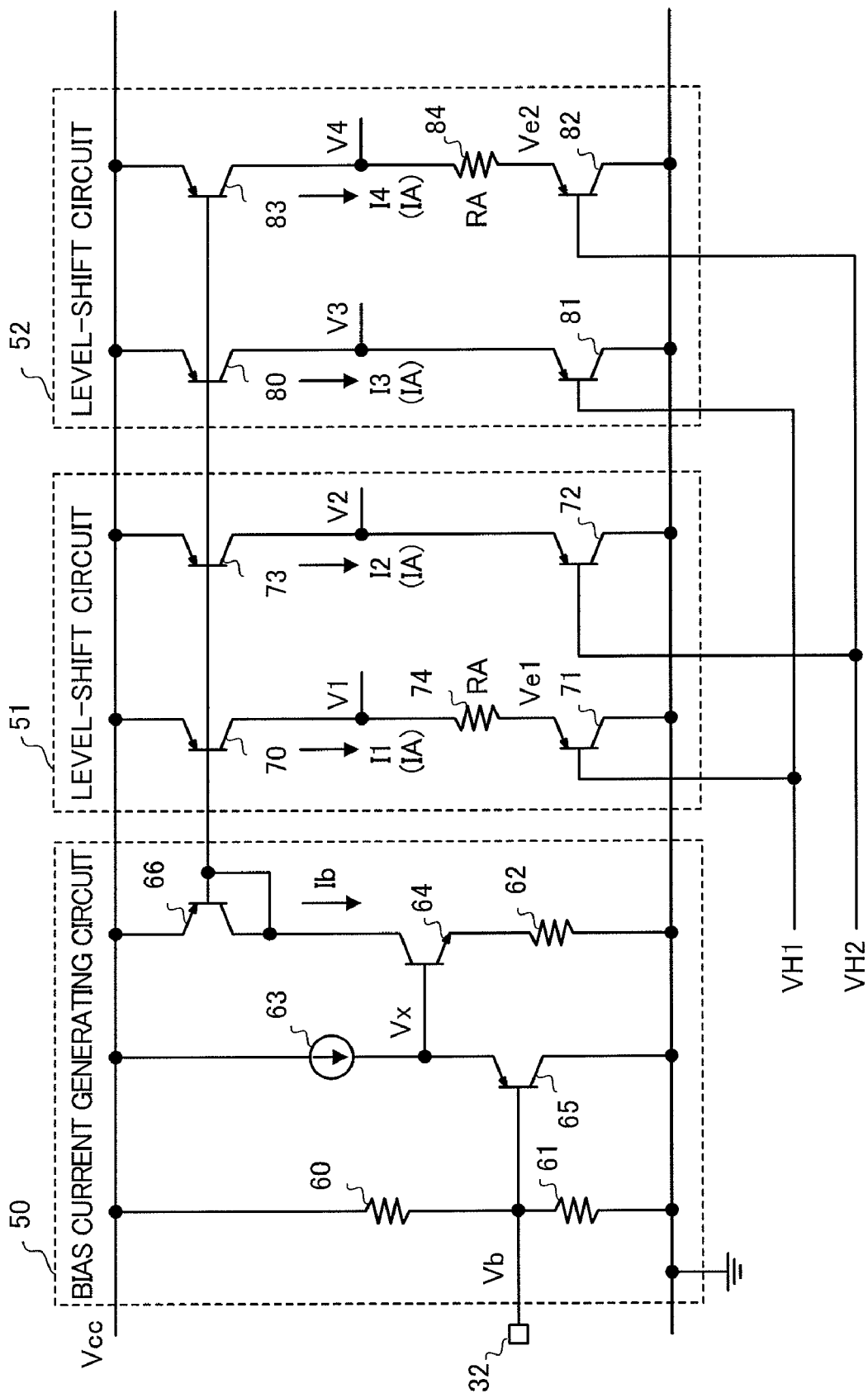
FIG. 3 is a diagram illustrating an embodiment of a bias current generating circuit 50 and level shift circuits 51 and 52.

The bias current generating circuit 50 is a circuit configured to generate a bias current Ib corresponding to the voltage Vb and includes resistors 60 to 62, a current source 63, an NPN transistor 64, and PNP transistors 65 and 66, as shown in FIG. 3, for example.

The resistors 60 and 61 are connected in series between a source voltage Vcc of the motor drive IC 10 and the ground GND, and generate the voltage Vb obtained by dividing the source voltage Vcc, for example. A node to which the resistor 60 and the resistor 61 are connected is connected to the terminal 32 and the base of the PNP transistor 65. Therefore, a resistor (not shown) is connected to the terminal 32, outside the motor drive IC 10, so that the voltage Vb can be changed, for example.

Since the emitter of the PNP transistor 65 is connected to the current source 63, the PNP transistor 65 and the current source 63 constitute an emitter follower. Therefore, a voltage Vx corresponding to the voltage Vb is output from the emitter of the PNP transistor 65. The voltage Vx is applied to the base of the NPN transistor 64, and the resistor 62 is connected to the emitter of the NPN transistor 64 as an emitter resistor. Further, the diode-connected PNP transistor 66 is connected to the collector of the NPN transistor 64. Thus, a bias current Ib corresponding to the voltage Vx and a resistance value of the resistor 62 is generated at the NPN transistor 64.

When the bias current Ib is generated, the level shift circuit 51 (first level shift circuit) shifts the levels of the hall signals VH1 and VH2 and generates an output signal V1 corresponding to the hall signal VH1 and an output signal V2 corresponding to the hall signal VH2, respectively. The level shift circuit 51 includes PNP transistors 70 to 73 and a resistor 74.

Since the bases of the PNP transistors 70 and 73 are connected to the base of the diode-connected PNP transistor 66, the PNP transistors 66, 70, and 73 constitute a current mirror. Therefore, the PNP transistors 70 and 73, respectively, generate currents I1 and I2 corresponding to the bias current Ib. It is assumed, in an embodiment of the present invention, that the PNP transistors 70 and 73 are designed to be equal in size so that both of the current values of the currents I1 and I2 become IA.

The hall signal VH1 is input to the base of the PNP transistor 71 (first transistor), and one end of the resistor 74 (first resistor) is connected to the emitter of the PNP transistor 71. Since the collector of the PNP transistor 70 (first bias current source) is connected to the other end of the resistor 74, the current I1 is supplied to the PNP transistor 71 via the resistor 74. As a result, the PNP transistors 70 and 71 and the resistor 74 constitute the so-called emitter follower. Here, for example, assuming that the base-emitter voltage of the PNP transistor 71 is 0.7 V, an emitter voltage Ve1 of the PNP transistor 71 is expressed by Ve1=VH1+0.7. The output signal V1 generated at the node, to which the PNP transistor 70 and the resistor 74 are connected, is expressed as follows:

$$V1 = Ve1 + RA \times IA = VH1 + 0.7 + RA \times IA \quad (1)$$

where the resistor 74 is RA.

The hall signal VH2 is input to the base of the PNP transistor 72 (second transistor) and the collector of the PNP transistor 73 (second bias current source) is connected to the emitter of the PNP transistor 72. Thus, the current I2 is supplied to the PNP transistor 72, and the PNP transistors 72 and 73 constitute an emitter follower. For example, assuming that the base-emitter voltage of the PNP transistor 72 is 0.7 V, the output signal V2 generated at the node, to which the PNP transistor 72 and the PNP transistor 73 are connected, is expressed as follows:

$$V2 = VH2 + 0.7 \quad (2).$$

As described above, the hall signals VH1 and VH2 are sinusoidal signals whose amplitude is of a predetermined voltage level. Thus, the level shift circuit 51 shifts the levels of the hall signals VH1 and VH2 so that a DC level of the output signal V1 becomes higher by RA×IA than the DC level of the output signal V2.

When the bias current Ib is generated, the level shift circuit 52 (second level shift circuit) shifts the levels of the hall signals VH1 and VH2 and generates an output signal V3 corresponding to the hall signal VH1 and an output signal V4 corresponding to the hall signal VH2, respectively. The level shift circuit 52 includes PNP transistors 80 to 83 and a resistor 84. Similarly to the PNP transistors 70 and 73, the PNP transistors 80 and 83, together with the PNP transistor 66, constitute a current mirror. Therefore, the PNP transistors 80 and 83 generate currents I3 and I4 corresponding to the bias current Ib, respectively. It is assumed, in an embodiment of the present invention, that the PNP transistors 80 and 83 are designed to be equal in size so that the current values of the currents I3 and I4 become IA described above.

The PNP transistors 80 and 81 are of a configuration similar to that of the PNP transistors 72 and 73. Thus, for example, assuming that the base-emitter voltage of the PNP transistor 81 is 0.7 V, the output signal V3 generated at the node, to which the PNP transistor 80 (third bias current source) and the PNP transistor 81 (third transistor) are connected, is expressed as follows:

$$V3 = VH1 + 0.7 \quad (3)$$

The PNP transistors 82 and 83 and the resistor 84 are of a configuration similar to that of the PNP transistors 70 and 71 and the resistor 74. Therefore, for example, assuming that the base-emitter voltage of the PNP transistor 82 (fourth transistor) is 0.7 V, an emitter voltage Ve2 of the PNP transistor 82 is expressed by Ve2=VH2+0.7. The output signal V4 generated at the node, to which the PNP transistor 83 (fourth bias current source) and the resistor 84 (second resistor) are connected, is as follows:

$$V4 = Ve2 + RA \times IA = VH2 + 0.7 + RA \times IA \quad (4)$$

where the resistance value of the resistor 84 is RA

Thus, the level shift circuit 52 shifts the levels of the hall signals VH1 and VH2 so that the DC level of the output signal V4 becomes higher by RA×IA than the DC level of the output signal V3.

The comparator 53 (first comparison circuit) compares the levels of the output signals V1 and V2 so as to detect timing of crossing in level of the output signals V1 and V2. Specifically, the comparator 53 outputs an L-level comparison signal Vc1 when the output signal V1 is higher in level than the output signal V2, and outputs an H-level comparison signal Vc1 when the output signal V1 is lower in level than the output signal V2.

The comparator 54 (second comparison circuit) compares the levels of the output signals V3 and V4 so as to detect timing of crossing in level of the output signals V3 and V4. Specifically, the comparator 54 outputs an L-level comparison signal Vc2 when the output signal V3 is higher in level than the output signal V4, and outputs an H-level comparison signal Vc2 when the output signal V3 is lower in level than the output signal V4. The comparators 53 and 54 correspond to a timing detecting circuit.

The inverter 55 inverts a logic level of the comparison signal Vc1. The AND circuit 56 calculates a logical multiplication of the comparison signal Vc2 and the output of the inverter 55 and outputs a result of the calculation as the signal Vssw. The inverter 55 and the AND circuit 56 correspond to an output circuit.

A description will be given of an operation of the soft-switching period generating circuit 21 with reference to FIG. 4. Here, it is assumed that the bias current Ib is generated at the bias current generating circuit 50.

Figure 4:
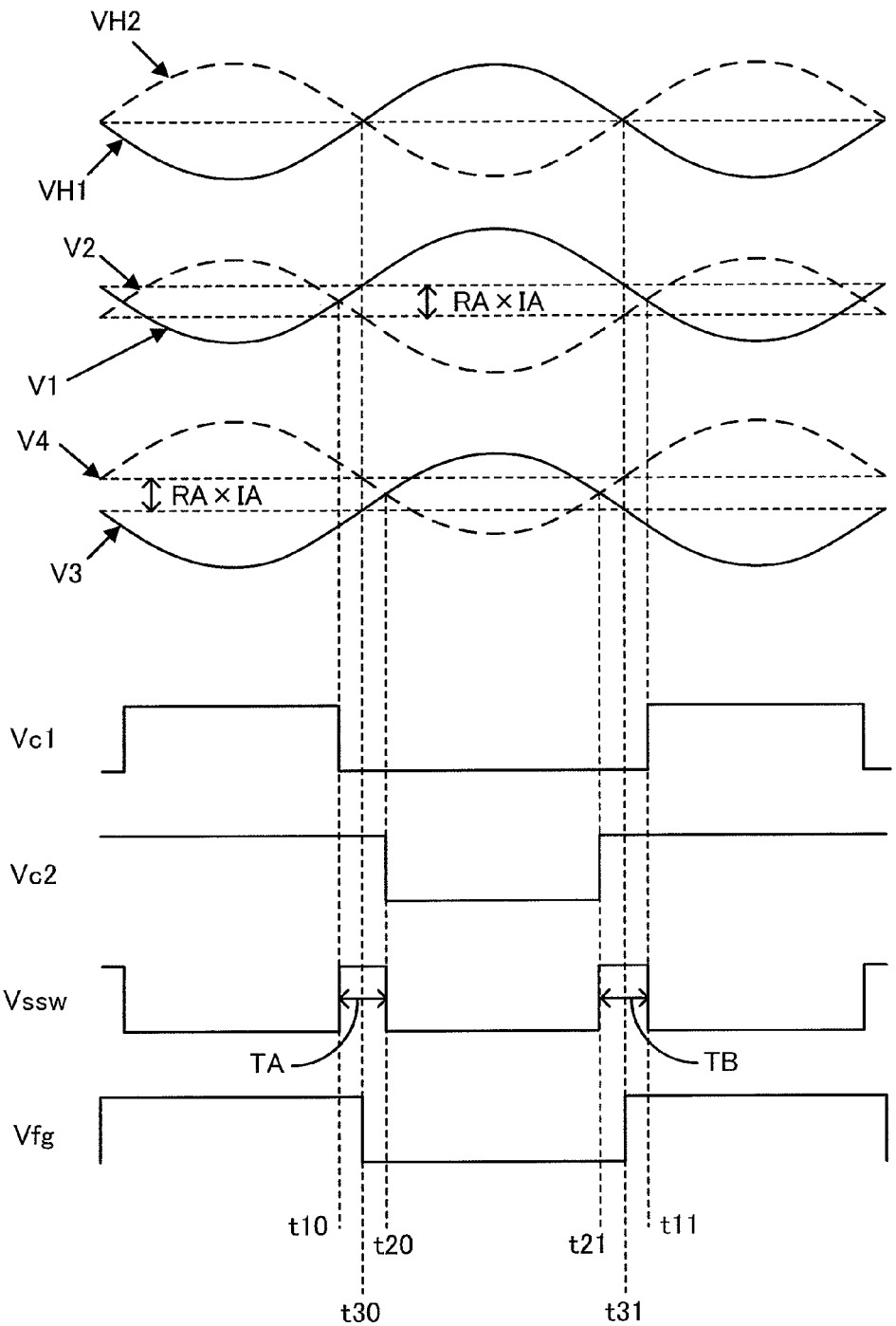
FIG. 4 is a diagram for describing an operation of a soft-switching period generating circuit 21.

When the hall signals VH1 and VH2 as shown at the top of FIG. 4 are input to the level shift circuit 51, the levels of the hall signals VH1 and VH2 are shifted so that the DC level of the output signal V1 becomes higher by RA×IA than the DC level of the output signal V2. Likewise, in the level shift circuit 52, the levels of the hall signals VH1 and VH2 are shifted so that the DC level of the output signal V4 becomes higher by RA×IA than the DC level of the output signal V3.

As a result, at timing t10 at which the output signal V1 becomes higher in level than the output signal V2, the comparison signal Vc1 goes to the L level, and at timing t11 at which the output signal V1 becomes lower in level than the output signal V2, the comparison signal Vc1 goes to the H level. At timing t20 at which the output signal V3 becomes higher in level than the output signal V4, the comparison signal Vc2 goes to the L level, and at timing t21 at which the output signal V3 becomes lower in level than the output signal V4, the comparison signal Vc2 goes to the H level. The signal Vssw goes to the H level only when the comparison signal Vc1 is at the L level and the comparison signal Vc2 is at the H level. Therefore, the signal Vssw is at the H level, for example, during a period TA from timing t10 to timing t20 and during a period TB from timing t21 to timing t11. As is apparent from FIG. 4, the signal Vssw goes to the H level around timing t30 and timing t31 at which the hall signals VH1 and VH2 cross in level. That is, the timing at which the hall signals VH1 and VH2 cross in level is included in the period during which the signal Vssw is at the H level.

The drive circuit 22 shown in FIG. 1 drives the NMOS transistors 25A and 25B and the PMOS transistors 26A and 26B constituting a so-called H-bridge circuit, based on the signals Vfg and Vssw. Specifically, the drive circuit 22 controls the MOS transistors of the H-bridge circuit so as to change a drive current Idr that drives a motor coil L of the single-phase motor 11. The drive circuit 22, and the NMOS transistors 25A and 25B and the PMOS transistors 26A and 26B constituting the H-bridge circuit, correspond to a drive circuit.

The drive circuit 22 included a PWM (Pulse Width Modulation) signal generating circuit 90 and a switching circuit 91.

Figure 5:
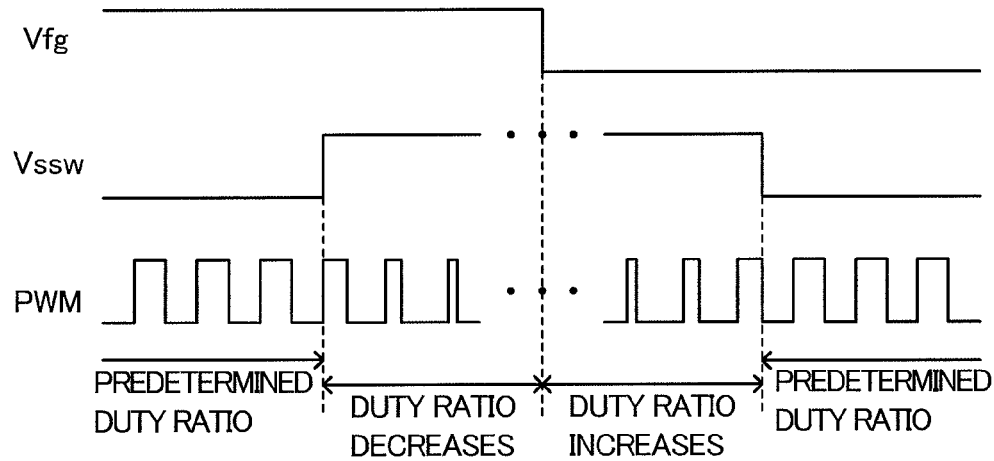
FIG. 5 is a diagram for describing an operation of a PWM signal generating circuit 90.

The PWM signal generating circuit 90 generates a PWM signal whose H-level duty ratio varies based on the signals Vfg and Vssw. Specifically, the PWM signal generating circuit 90 generates the PWM signal having a predetermined duty ratio when the signal Vssw is at the L level, as shown in FIG. 5. When the signal Vssw goes to the H level, the PWM signal generating circuit 90 reduces the duty ratio by half for each cycle of the PWM signal, for example, until the signal Vfg changes in logic level. When the signal Vfg changes in logic level, the PWM signal generating circuit 90 increases the duty ratio to be doubled for each cycle of the PWM signal, for example, until the signal Vssw goes to the L level.

When the signal Vfg is at the H level, the switching circuit 91 turns on the PMOS transistor 26A and turns off the NMOS transistor 25A and PMOS transistor 26B, as well as performs switching for the NMOS transistor 25B with the PWM signal, for example. Thus, the drive current Idr flows through the motor coil L of the single-phase motor 11 in the direction from the terminal 33 to the terminal 34.

When the signal Vfg is at the L level, the switching circuit 91 turns on the PMOS transistor 26B and turns off the NMOS transistor 25B and PMOS transistor 26A, as well as performs switching for the NMOS transistor 25A with the PWM signal, for example. Thus, the drive current Idr flows through the motor coil L in the direction from the terminal 34 to the terminal 33.

<Operation of Motor Drive IC 10>

A description will be given of an operation of the motor drive IC 10. Here, a voltage Vg1 represents the gate voltage of the NMOS transistor 25B and a voltage Vg2 represents the gate voltage of the NMOS transistor 25A. Further, Ix represents the current value of the drive current Idr when switching is performed for the NMOS transistor 25B based on the PWM signal of the predetermined duty ratio described above, and −Ix represents the current value of the drive current Idr when switching is performed for the NMOS transistor 25A based on the PWM signal of the predetermined duty ratio described above.

Figure 6:
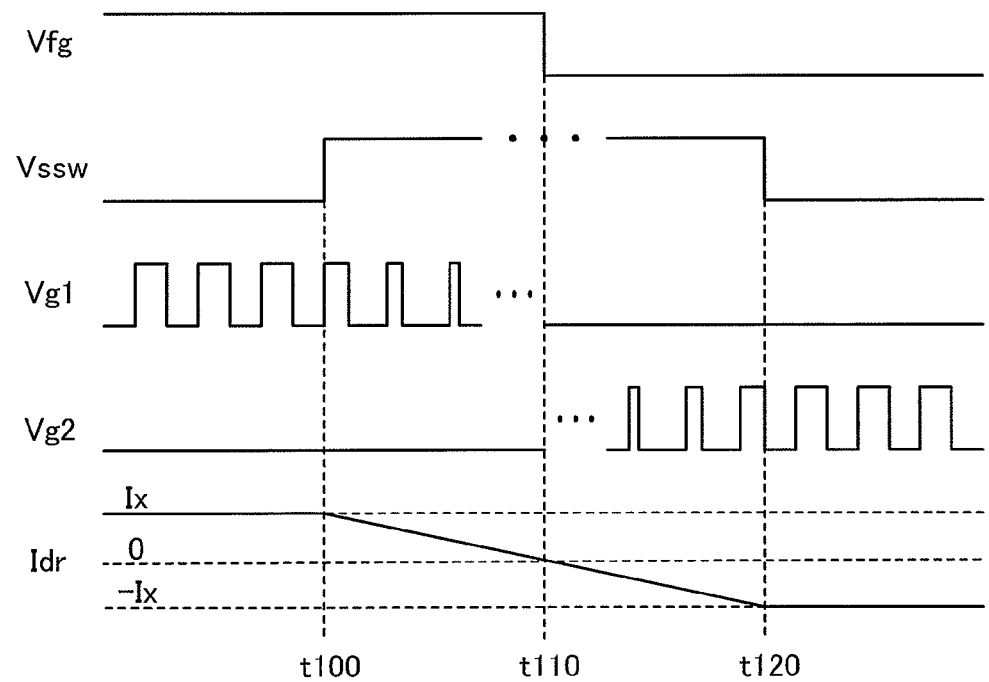
FIG. 6 is a diagram for describing an operation of a motor drive IC 10.

When the hall signals VH1 and VH2 of the frequency corresponding to the rotational speed of the single-phase motor 11 is input to the motor drive IC 10, the signal Vssw goes to the H level around the timing at which the signal Vfg changes in logic level, as described above. For example, as shown in FIG. 6, when the signal Vfg is at the H level and the signal Vssw is at the L level, the switching circuit 91 performs switching for the NMOS transistor 25B using the PWM signal having the predetermined duty ratio. Thus, the voltage Vg1 changes in the same manner as the PWM signal does, and the drive current Idr has the current value of Ix until time t100. When the signal Vssw goes to the H level at time t100, namely, when a soft-switching period starts, the duty ratio of the PWM signal is reduced. This shortens the period during which the voltage Vg1 is at the H level and gradually decreases the current value of the drive current Idr. During the period from time t100 to time t110, during which the signal Vfg is at the H level, although the drive current Idr is decreased in current value, the drive current Idr flows in the direction from the terminal 33 to the terminal 34.

When the signal Vfg goes to the L level at time t110, the switching circuit 91 controls the NMOS transistors 25A and 25B and the PMOS transistors 26A and 26B so that the drive current Idr will flow in the direction from the terminal 34 to the terminal 33. Then, since the duty ratio of the PWM signal for perform switching for the NMOS transistor 25A increases as described above, the period during which the voltage Vg2 is at the H level becomes longer in a gradual manner. Therefore, the drive current Idr which flows in the direction from the terminal 34 to the terminal 33 increases in current value in a gradual manner. When the signal Vssw goes to the L level at time t120, namely, when the soft-switching period ends, the PWM signal has the predetermined duty ratio. As a result, at time t120, the drive current Idr has the current value of −Ix. Thereafter, the motor drive IC 10 repeats the similar operation.

Hereinabove, the description has been given of the motor drive IC 10 according to an embodiment of the present invention. As described in FIG. 4, for example, the level shift circuit 51 shifts the levels of the hall signals VH1 and VH2 so that the period during which the output signal V1 is higher in level than the output signal V2 becomes longer than the period during which the output signal V2 is higher in level than the output signal V1. The level shift circuit 52 shifts the levels of the hall signals VH1 and VH2 so that the period during which the output signal V3 is higher in level than the output signal V4 becomes shorter than the period during which the output signal V4 is higher in level than the output signal V3. The comparator 53 detects the timing of the crossing in level of the output signals V1 and V2 (e.g., timing t10), and the comparator 54 detects the timing of the crossing in level of the output signals V3 and V4 (e.g., timing t20). Further, the inverter 55 and the AND circuit 56 output, to the drive circuit 22, the signal for gradually changing the drive current Idr, namely, the H-level signal Vssw indicating the soft-switching period, only during the period (e.g., period TA) between the timing detected by the comparator 53 and the timing detected by the comparator 54.

In such a motor drive IC 10, for example, even when the hall signals VH1 and VH2 changes in frequency, there is no change in the difference in DC level between the output signals V1 and V2 and in the difference in DC level between the output signals V3 and V4. Thus, for example, when the hall signals VH1 and VH2 becomes higher in frequency, for example, the period TA becomes shorter. On the other hand, when the hall signals VH1 and VH2 becomes lower in frequency, for example, the period TA becomes longer. Therefore, in the motor drive IC 10, the period, during which the signal Vssw is at the H level, for determining the soft-switching period changes according to the frequency of the hall signals VH1 and VH2. Therefore, the motor drive IC 10 is capable of changing the soft-switching period according to the rotational speed of the single-phase motor 11. That is, the motor drive IC 10 is capable of suppressing the noise generated by the single-phase motor 11 while allowing the motor to be at a desired rotational speed.

The timing of the crossing in level of the output signals V1 and V2 can reliably be detected by comparator 53 comparing the levels of the output signals V1 and V2. Further, the timing of the crossing in level of the output signals V3 and V4 can reliably be detected by comparator 54 comparing the levels of the output signals V3 and V4.

The motor drive IC 10 performs the soft-switching only during the period during which the signal Vssw is at the H level. As described above, the period TA during which the signal Vssw is at the H level is determined based on the timing of the crossing in level of the output signals V1 and V2 and the timing of the crossing in level of the output signals V3 and V4. The timing of the crossing in level of the output signals V1 and V2 can freely be set by the resistance value of the resistor 74 or the current value of the current I1 being changed, for example. Similarly, the timing of the crossing in level of the output signals V3 and V4 can freely be set by the resistance value of the resistor 84 or the current value of the current I4 being, for example. Thus, the soft-switching period can freely be set using the level shift circuits 51 and 52 according to an embodiment of the present invention. As a result, the soft-switching period can also be set freely corresponding to the type of the motor coil L or characteristics of the hall element 12, for example.

All the current values of the currents I1 to I4, generated at the level shift circuits 51 and 52, are IA. Thus, in an embodiment of the present invention, the soft-switching period can be set by adjusting only the resistance values of the resistors 74 and 84.

In an embodiment of the present invention, both of the resistance value of the resistor 74 and the resistance value of the resistor 84 are RA. Thus, in the soft-switching period, the period for decreasing the drive current Idr (e.g., period from timing t10 to timing t30) can be made equal to the period for increasing the drive current Idr (e.g., period from timing t30 to timing t20). This makes it possible to change the drive current Idr more continuously as compared with the case where there is a difference between the period for decreasing the drive current Idr and the period for increasing the drive current Idr, for example.

The above embodiments of the present invention are simply for facilitating the understanding of the present invention and are not in any way to be construed as limiting the present invention. The present invention may variously be changed or altered without departing from its spirit and encompass equivalents thereof.

For example, instead of using the level shift circuit 51, a configuration may be such that the hall signal VH1 is level-shifted using an emitter follower, while the hall signal VH2 is input to the comparator 53 as it is, without being level-shifted, for example. Further, instead of using the level shift circuit 52, a configuration may be such that the hall signal VH2 is level-shifted using an emitter follower, while the hall signal VH1 is input to the comparator 54 as it is, without being level-shifted. Even in the case of such a configuration, the soft-switching period can be changed according to the rotational speed of the single-phase motor 11, for example.

What is claimed is:

1. A motor drive circuit configured to drive a motor based on first and second position detection signals opposite in phase to each other, the signals having a frequency corresponding to a rotational speed of the motor and indicating a rotational position of the motor, the circuit comprising:
   a first level-shift circuit configured to shift a level of at least either one of the first and second position detection signals so that a period, during which a first output signal corresponding to the first position detection signal is higher in level than a second output signal corresponding to the second position detection signal, becomes longer than a period, during which the second output signal is higher in level than the first output signal;
   a second level-shift circuit configured to shift a level of at least either one of the first and second position detection signals so that a period, during which a third output signal corresponding to the first position detection signal is higher in level than a fourth output signal corresponding to the second position detection signal, becomes shorter than a period, during which the fourth output signal is higher in level than the third output signal;
   a timing detecting circuit configured to detect first timing at which the first and second output signals cross in level, and second timing at which the third and fourth output signals cross in level; and
   an output circuit configured to output, to a drive circuit configured to drive a coil of the motor, an instruction signal for changing a drive current of the coil in a gradual manner only during a period between the first timing and the second timing, the period including a third timing at which the first and second position detection signals cross in level.

2. The motor drive circuit according to claim 1, wherein the timing detecting circuit includes:
   a first comparison circuit configured to compare the levels between the first and second output signals, to detect the first timing; and a second comparison circuit configured to compare the levels between the third and fourth output signals, to detect the second timing.

3. The motor drive circuit according to claim 2, wherein the first level-shift circuit includes:
   a first transistor having a control electrode to which the first position detection signal is input;
   a first resistor having one end connected to an output electrode of the first transistor;
   a first bias current source connected in series to the first resistor so that the first output signal is output from the other end of the first resistor;
   a second transistor having a control electrode to which the second position detection signal is input; and
   a second bias current source connected in series to the second transistor so that the second output signal is output from an output electrode of the second transistor, and wherein
the second level-shift circuit includes:
   a third transistor having a control electrode to which the first position detection signal is input;
   a third bias current source connected in series to the third transistor so that the third output signal is output from an output electrode of the third transistor;
   a fourth transistor having a control electrode to which the second position detection signal is input;
   a second resistor having one end connected to an output electrode of the fourth transistor; and
   a fourth bias current source connected in series to the second resistor so that the fourth output signal is output from the other end of the second resistor.

4. The motor drive circuit according to claim 1, wherein the first level-shift circuit includes:
   a first transistor having a control electrode to which the first position detection signal is input;
   a first resistor having one end connected to an output electrode of the first transistor;
   a first bias current source connected in series to the first resistor so that the first output signal is output from the other end of the first resistor;
   a second transistor having a control electrode to which the second position detection signal is input; and
   a second bias current source connected in series to the second transistor so that the second output signal is output from an output electrode of the second transistor, and wherein
the second level-shift circuit includes:
   a third transistor having a control electrode to which the first position detection signal is input;
   a third bias current source connected in series to the third transistor so that the third output signal is output from an output electrode of the third transistor;
   a fourth transistor having a control electrode to which the second position detection signal is input;
   a second resistor having one end connected to an output electrode of the fourth transistor; and
   a fourth bias current source connected in series to the second resistor so that the fourth output signal is output from the other end of the second resistor.

5. The motor drive circuit according to claim 4, wherein the first to fourth bias current sources generate currents of the same current value.

6. The motor drive circuit according to claim 5, wherein the first resistor is equal in resistance value to the second resistor.

* * * * *